United States Patent [19]

Kruschwitz

[11] Patent Number: 4,614,347
[45] Date of Patent: Sep. 30, 1986

[54] ASSEMBLED TRIMMING AND SEALING STRIP

[75] Inventor: Werner Kruschwitz, Viersen, Fed. Rep. of Germany

[73] Assignee: Draftex Industries, Limited, Edinburgh, Scotland

[21] Appl. No.: 673,169

[22] Filed: Nov. 19, 1984

[30] Foreign Application Priority Data

Jan. 27, 1984 [GB] United Kingdom ................ 8402139

[51] Int. Cl.$^4$ ........................... F16J 15/12; E06B 7/16
[52] U.S. Cl. ................................... 277/184; 277/186; 52/208; 296/93
[58] Field of Search ............................. 277/181–186, 277/205, 206 R, 226; 296/93; 52/208, 309.3, 309.5, 403

[56] References Cited

U.S. PATENT DOCUMENTS

| 4,015,398 | 4/1977 | Bright | 52/208 X |
|---|---|---|---|
| 4,119,325 | 10/1978 | Oakley et al. | 296/93 X |
| 4,139,971 | 2/1979 | Kimura | 52/208 |
| 4,202,555 | 5/1980 | Becker et al. | 277/186 X |
| 4,240,643 | 12/1980 | Becker et al. | 277/186 X |
| 4,310,164 | 1/1982 | Mesnel | 296/93 X |

FOREIGN PATENT DOCUMENTS

| 150872 | 7/1955 | Sweden | 296/93 |
|---|---|---|---|
| 1230894 | 5/1971 | United Kingdom | 52/208 |
| 1405014 | 9/1975 | United Kingdom | 296/93 |
| 1512786 | 6/1978 | United Kingdom . | |
| 1512841 | 6/1978 | United Kingdom . | |

Primary Examiner—Robert S. Ward
Attorney, Agent, or Firm—Leydig, Voit & Mayer, Ltd.

[57] ABSTRACT

A sealing and trimming strip arrangement in two parts which are locked together by means of a key carried by one part which fits into a channel defined in the other part. The latter part is secured to a flanged joint running around a vehicle door opening by means of double-sided adhesive strip and carries a soft seal. The first part is adapted to trap and hold the head or other lining material on the inside of the vehicle body.

4 Claims, 2 Drawing Figures

ASSEMBLED TRIMMING AND SEALING STRIP

BACKGROUND OF THE INVENTION

The invention relates to sealing and/or trimming strip arrangements particularly though not exclusively for use in motor vehicle body construction.

An aim of the invention is to provide an improved strip arrangement which is more securely held in position and more economic to manufacture.

BRIEF SUMMARY OF THE INVENTION

According to the invention, there is provided a trimming and sealing strip arrangement, comprising two separate parts which are adapted to be fixed together and so shaped that when so fixed together they define a generally channel-shape, one said part being adapted to be adhesively secured to a mounting member on which the strip arrangement is to be mounted.

According to the invention, there is also provided a trimming and sealing strip assembly, comprising first and second separate elongated parts each of generally "L"-shape in cross-section which are mechanically interlocked together to define a generally channel-shape in use which is adapted for embracing a flanged joint running at least partly around a door opening in a vehicle body, the first part presenting a surface which faces towards a surface of the flanged joint on the outside of the vehicle body and which is secured thereto by adhesive and presenting another surface facing in the opposite direction and on which is mounted a soft and resilient seal, and the said second part being adapted to resiliently cover the edge of, and to secure, a lining terminating adjacent the flanged joint on the inside of the vehicle body.

DESCRIPTION OF DRAWINGS

A sealing and trimming strip arrangement embodying the invention will now be described, by way of example only, with reference to the accompanying diagrammatic drawings in which.

DESCRIPTION OF PREFERRED EMBODIMENTS

Figure 1:
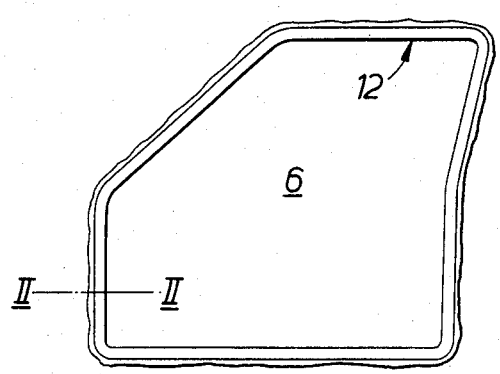
FIG. 1 is a side view of a door opening in a motor vehicle body.

As shown in FIG. 1, a motor vehicle body has a door opening 6 which is defined by inner and outer body panels 8,10 (see FIG. 2) which are welded together to form a flanged joint 12 running around the vehicle opening.

Figure 2:
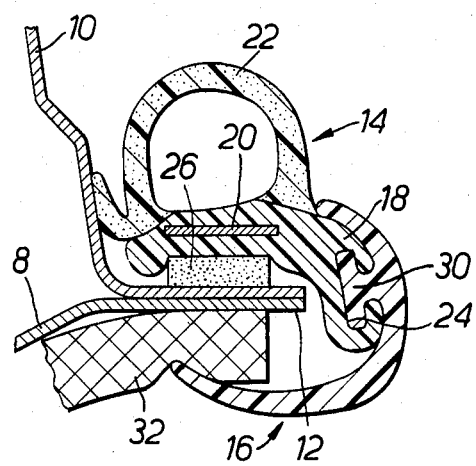
FIG. 2 is a cross-section on the line II—II of FIG. 1 showing the sealing and trimming strip arrangement in position.

As shown in FIG. 2, the strip arrangement is in two parts, a seal mounting part 14 and a trim part 16. The seal mounting part 14 comprises relatively hard plastics or rubber material 18 having embedded within it a metal reinforcing strip 20, such as made of aluminium for example. A hollow tubular seal 22 is mounted on the outside of the relatively hard material 18. The seal 22 may be of sponge or foamed consistency material for example. Advantageously, the seal 22 is extruded integrally with the material 18 by a known duplex extrusion process. Instead, however, it could be manufactured separately and then fixed to the material 18 by means of adhesive.

In the view shown in FIG. 2, the seal mounting strip 14 is of reversed "L" shape, and the base of the reversed "L" is formed with a continuous channel 24 with re-entrant openings in the sides 24.

In use, the seal mounting part 14 is attached to the surface of the flanged joint 12 which faces outwardly of the vehicle body. It is mounted in this position by means of double-sided adhesive strip 26 which runs the full length of the seal mounting part 14. The strip 26 is made of flexible material having two opposite major surfaces which are provided with layers of suitable adhesive, these in turn being covered by removable coverings. In use, one such covering is removed to expose one adhesive layer by means of which the strip 26 is fixed to a surface of the part 14. The oppositely positioned covering is then removed to expose the other adhesive layer, by means of which the part 14 is attached to the surface of the flanged joint 12.

The trim part 16 is made of relatively stiff rubber or plastics material and is of curved shape, and on its inside curved surface it has an integrally formed key 30.

In use, the trim part 16 is fitted rigidly onto the seal mounting part 14 by clipping its key 30 into the channel 24. As shown in FIG. 2, therefore, the trim part 16 extends over the inside surface of the flanged joint 12 and, in particular, can be used to cover the edge of, and to hold in position, the fabric or cloth lining 32 on the inside of the body—the head lining or fabric covering on the inside of the door pillars, for example.

The foregoing description assumes that the seal mounting part 14 is fixed in position on the flanged joint 12 before the trim part 16 is clipped into position. However, instead the parts 14 and 16 could be assembled together to form a complete generally channel-shaped assembly which would be fitted over the flanged joint 12 as a whole and secured in position by the double-sided adhesive strip 26. In this case, the trim part 16 would be flexed outwardly so as to enable it to be snapped down over the lining 32.

The trim part 16 is shown without any metal reinforcement but could be so provided if desired.

Each of the parts 14 and 16 would normally be sized and pre-formed to match the shape and size of the door opening.

The arrangement shown is suitable for automated assembly onto the vehicle body.

What is claimed is:

1. A trimming and sealing strip assembly for mounting on a flanged joint running at least partly around a door opening in a vehicle body, comprising first and second separate elongated parts of resilient material each of generally L-shape in cross-section which are mechanically interlocked together to define a generally channel-shape which embraces the flanged joint, the first part presenting a surface which faces towards a surface of the flanged joint on the outside of the vehicle body and which is secured thereto by adhesive and presenting another surface facing in the opposite direction and on which is mounted a soft and resilient seal, the said second part being adapted to hinge relative to the first part about an axis parallel to the elongate direction so as to cover the edge of, and to secure, a lining terminating adjacent the flanged joint on the inside of the vehicle body.

2. An assembly according to claim 1, in which the said first part has an embedded metal reinforcement strip.

3. An assembly according to claim 1, in which the first part is adhesively secured to the flanged joint by means of double-sided adhesive strip.

4. An arrangement according to claim 1, in which one said part defines a channel and the other said part defines a matching key carried by the other part which is received and gripped by the said channel.

* * * * *